(12) United States Patent
Shiramizu et al.

(10) Patent No.: US 8,840,252 B2
(45) Date of Patent: Sep. 23, 2014

(54) IMAGE DISPLAY APPARATUS AND PORTABLE INFORMATION PROCESSING APPARATUS HAVING THE SAME

(75) Inventors: Takahisa Shiramizu, Saga (JP); Kazutaka Yasuda, Kumamoto (JP); Takayuki Ooie, Fukuoka (JP)

(73) Assignee: Panasonic Corporation, Osaka (JP)

( * ) Notice: Subject to any disclaimer, the term of this patent is extended or adjusted under 35 U.S.C. 154(b) by 328 days.

(21) Appl. No.: 13/361,402

(22) Filed: Jan. 30, 2012

(65) Prior Publication Data

US 2012/0229779 A1 Sep. 13, 2012

(30) Foreign Application Priority Data

Mar. 11, 2011 (JP) ................................ 2011-053947
Mar. 11, 2011 (JP) ................................ 2011-053950

(51) Int. Cl.

| | |
|---|---|
| G03B 21/00 | (2006.01) |
| G03B 21/14 | (2006.01) |
| H04N 5/238 | (2006.01) |
| G06F 1/16 | (2006.01) |
| G02B 27/00 | (2006.01) |
| G02F 1/13 | (2006.01) |
| G02B 6/42 | (2006.01) |
| G03B 21/30 | (2006.01) |
| H04N 5/74 | (2006.01) |
| H04N 9/31 | (2006.01) |
| G03B 27/68 | (2006.01) |
| G03B 29/00 | (2006.01) |
| G03B 21/20 | (2006.01) |

(52) U.S. Cl.
CPC ............... *H04N 5/74* (2013.01); *G03B 21/142* (2013.01); *G06F 1/1632* (2013.01); *G02B 27/0068* (2013.01); *G02F 1/1323* (2013.01); *G02B 6/422* (2013.01); *G03B 21/30* (2013.01); *G02B 27/0025* (2013.01); *G03B 29/00* (2013.01); *H04N 9/3185* (2013.01); *G06F 1/1649* (2013.01); *G03B 21/2033* (2013.01); *H04N 5/7475* (2013.01); *G03B 27/68* (2013.01)
USPC .............. 353/70; 353/71; 353/119; 348/369

(58) Field of Classification Search
CPC .... G03B 21/00; G03B 21/147; G03B 21/142; G03B 27/68; H04N 9/3185; G02F 1/1323; G02B 27/0025; G02B 27/0068; G02B 6/422
USPC ...................... 353/70–71, 119, 122; 348/369
See application file for complete search history.

(56) References Cited

U.S. PATENT DOCUMENTS

2005/0052620 A1* 3/2005 Tamura ........................... 353/69
2005/0073661 A1 4/2005 Tamura (Continued)

FOREIGN PATENT DOCUMENTS

| JP | 08-328487 | 12/1996 |
|---|---|---|
| JP | 9-270979 | 10/1997 |

(Continued)

OTHER PUBLICATIONS

Extended European Search Report, dated Jun. 22, 2012.

(Continued)

*Primary Examiner* — Georgia Y Epps
*Assistant Examiner* — Magda Cruz
(74) *Attorney, Agent, or Firm* — Greenblum & Bernstein, P.L.C.

(57) ABSTRACT

An image display apparatus improves usability for a user in the case where a screen image is projected on a ceiling as a screen. The image display apparatus includes: a projection unit capable of vertically changing a projection angle; a projection angle detector detecting the projection angle of the projection unit; and a screen image corrector reversing a projected screen image. The screen image corrector switches the projected screen image from a reversed display to a standard display when the projection angle detected by the projection angle detector is less than or equal to a predetermined value.

6 Claims, 15 Drawing Sheets

(56) References Cited

U.S. PATENT DOCUMENTS

| | | |
|---|---|---|
| 2007/0177115 A1 | 8/2007 | Yin et al. |
| 2008/0136973 A1 | 6/2008 | Park |
| 2009/0237620 A1 * | 9/2009 | Yamamoto et al. ............. 353/69 |
| 2009/0257182 A1 | 10/2009 | Yang |

FOREIGN PATENT DOCUMENTS

| | | |
|---|---|---|
| JP | 2004-077545 | 3/2004 |
| JP | 2005-181879 | 7/2005 |
| JP | 2006014233 | 1/2006 |
| JP | 2006-195318 | 7/2006 |
| JP | 2007-178596 | 7/2007 |
| JP | 2009-229563 | 10/2009 |
| JP | 2010-072318 | 4/2010 |
| JP | 2010-078634 | 4/2010 |

OTHER PUBLICATIONS

Japan Office action, mail date is Feb. 4, 2014.

* cited by examiner

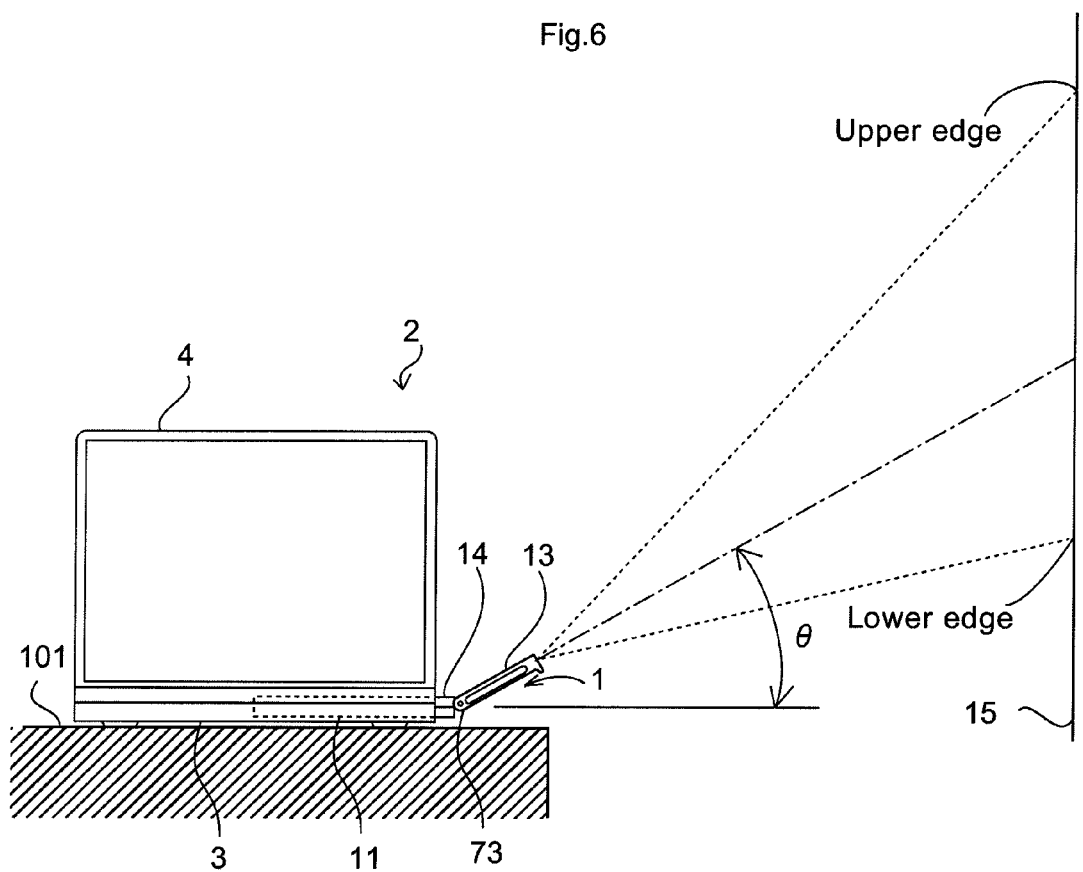

Projection on wall

Output screen image

Projected screen image

Output screen image after correction

Projected screen image after correction

Projection on ceiling (Not reversed)

Output screen image

Projected screen image

Output screen image after correction

Projected screen image after correction

Projection on ceiling (reversed)

Original screen image

- Upper edge
- Lower edge

Screen image after trapezoidal distortion correction

- Upper edge
- Lower edge

Reversed screen image

- Upper edge
- Lower edge

Projected screen image after correction

- Upper edge
- Lower edge

IMAGE DISPLAY APPARATUS AND PORTABLE INFORMATION PROCESSING APPARATUS HAVING THE SAME

CROSS-REFERENCE TO RELATED APPLICATIONS

The present application claims priority under 35 U.S.C. §119 of Japanese Application Nos. 2011-53950 and 2011-53947, both of which were filed on Mar. 11, 2011, the disclosures of which are expressly incorporated by reference herein in their entireties.

BACKGROUND OF THE INVENTION

1. Field of the Invention

The present invention relates to an image display apparatus having a function to correct trapezoidal distortion caused when a screen image is projected on a screen from an angle, and an information processing apparatus having the image display apparatus.

2. Description of Related Art

An image display apparatus that projects a screen image on a screen has no problem when the screen image is projected on the screen straight from a side of the apparatus. In a case where the screen image is projected on the screen from an angle, however, trapezoidal distortion occurs, in which a rectangular output screen image is distorted into a trapezoidal shape. Then, trapezoidal distortion correction (Keystone correction) is performed to convert the rectangular output screen image into a trapezoidal shape in the reverse direction of the distorted trapezoidal shape of the screen image projected on the screen. Thus, a non-distorted rectangular screen image can be displayed on the screen.

Such trapezoidal distortion correction may be configured such that a user manually makes an adjustment while viewing the screen image on the screen. Because the work of adjustment is cumbersome, a technology is known that automatically corrects trapezoidal distortion, thus eliminating manual adjustment by a user, as described in Japanese Patent Laid-open Publication Nos. H9-270979 and 2006-14233, for example. When an image display apparatus itself is installed in a tilted state, such a technology detects with a sensor an installation angle of the image display apparatus and corrects trapezoidal distortion in accordance with the installation angle.

In the conventional technology, the image display apparatus itself is installed in a tilted state. However, a projection unit of an image display apparatus may be rotatably provided in a main body so as to substantially change a projection angle. Then, a screen image can be projected on a ceiling as a screen in addition to a wall as a screen, thus enhancing usability.

Depending on a positional relationship between a user looking up to the ceiling from below and the screen image, however, the screen image appears upside down. In this case, a circumstance arises where a user needs to move or rotate the image display apparatus in order to improve viewability, and thus usability for the user is reduced.

SUMMARY OF THE INVENTION

An advantage of the present invention is to provide an image display apparatus configured to improve usability for a user in the case of projection on a ceiling as a screen, and a portable information processing apparatus having the image display apparatus.

In order to address the circumstance above, the image display apparatus of the present invention includes: a projection unit capable of vertically changing a projection angle; a projection angle detector detecting the projection angle of the projection unit; and a screen image corrector reversing a projected screen image. The screen image corrector switches a display mode between a standard display mode displaying a screen image in a non-reversed state and a reversed display mode displaying a screen image in a reversed state, according to an instruction from a user. In a state where the reversed display mode is set, the screen image corrector switches from the reversed display mode to the standard display mode when the projection angle detected by the projection angle detector is less than or equal to a predetermined value.

A portable information processing apparatus of the present invention has the image display apparatus. The image display apparatus is housed in a drive bay provided to a main body of the information processing apparatus.

According to the present invention, in the case of projection on the ceiling as a screen, the screen image can be displayed in reverse according to the user's needs, thus improving viewability of the screen image projected on the ceiling for the user looking up to the ceiling from below, and improving usability for the user. When the projection of the screen image is changed to projection on a wall as a screen, the display mode automatically returns to the standard display mode without operation by the user to switch the display mode, thus improving usability for the user.

An image display apparatus of the present invention includes: a projection unit capable of vertically changing a projection angle; a projection angle detector detecting the projection angle of the projection unit; a screen image corrector correcting trapezoidal distortion of a screen image and reversing the screen image; and an operation section controlling a first processing that changes an amount of trapezoidal distortion correction and a second processing that reverses the screen image. The operation section causes the screen image corrector to perform the first processing according to control by the user when the projection angle detector detects a projection angle less than or equal to a predetermined value, and the operation section causes the screen image corrector to perform the second processing according to control by the user when the projection angle detector detects a projection angle greater than a predetermined value.

According to the present invention, in the case of projection of the screen image on the ceiling as a screen, the screen image can be displayed in reverse according to the user's needs, thus improving viewability of the screen image projected on the ceiling for the user looking up to the ceiling from below, and improving usability for the user. The operation section that changes an amount of the trapezoidal distortion correction is also used for switching the display mode. Therefore, it is possible to eliminate the necessity for another operation section that switches the display mode, thus preventing manufacturing cost from increasing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 6 is a side view illustrating a state in which a screen image is projected obliquely upward to a wall as a screen;

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Hereinafter, an embodiment of the present invention will be explained with reference to the drawings.

Figure 1:
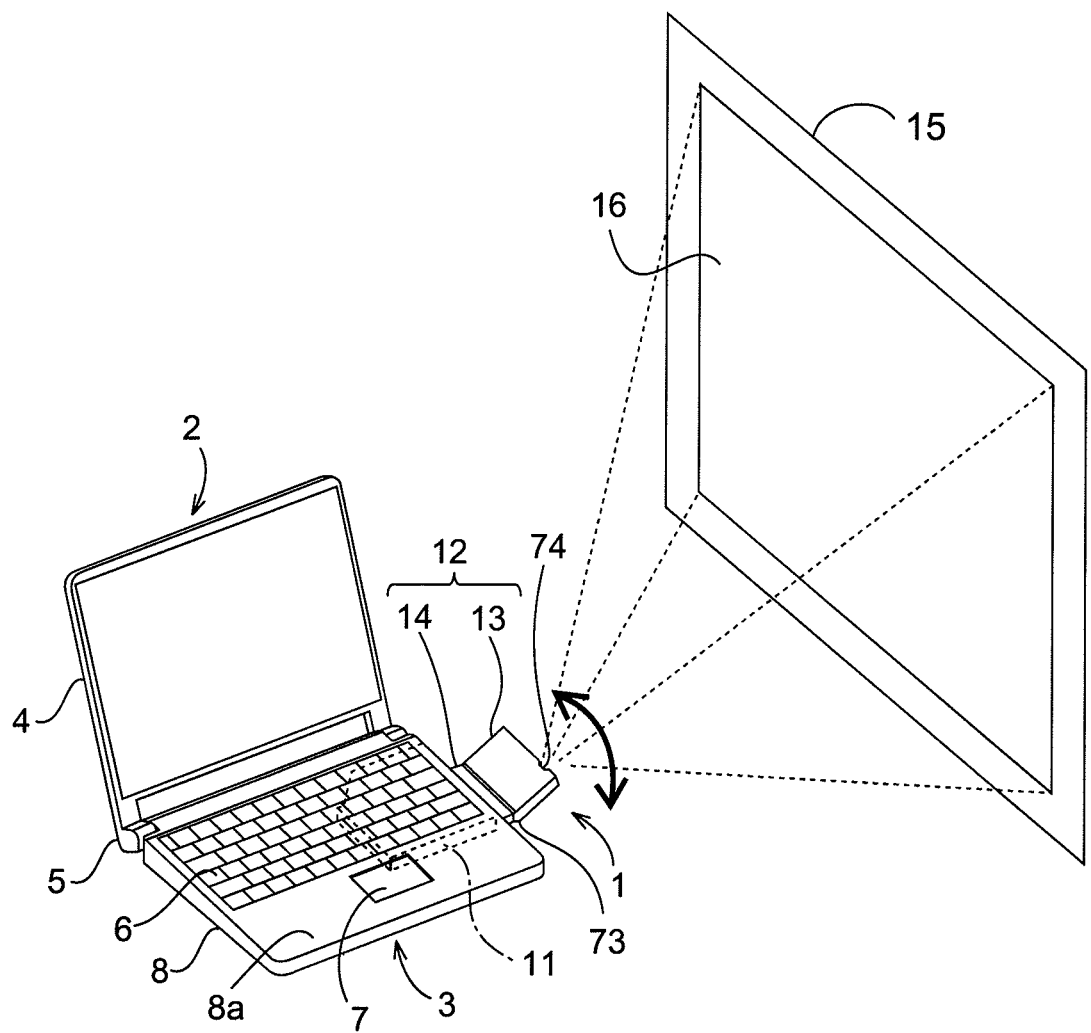
FIG. 1 is a perspective view illustrating an example in which an image display apparatus of the present invention is installed in a portable information processing apparatus.

FIG. 1 is a perspective view illustrating an example in which an image display apparatus 1 of the present invention is installed in a portable information processing apparatus 2. The portable information processing apparatus 2 has a main body 3 and a display 4, the main body 3 including a control board (not shown in the drawing) on which a CPU and a memory are mounted, the display 4 being provided with a liquid crystal panel. The main body 3 and the display 4 are connected by a hinge 5 such that the main body 3 and the display 4 are folded together to enhance portability.

A keyboard 6 and a touch pad 7 are provided in an upper surface 8a of a case 8 of the main body 3. A drive bay or a housing space in which a peripheral is replaceably housed is provided on an underside of the keyboard 6 of the case 8 of the main body 3, the peripheral being an optical disk apparatus and the like (that performs at least one of recording and playing of information in an optical disk, such as a blue-ray disc, a DVD, a CD, and the like). The image display apparatus 1 is installed in the drive bay.

The image display apparatus 1 has a case 11 and a portable body 12 insertable to and removable from the case 11. The portable body 12 includes an optical engine unit (projection unit) 13 and a control unit (support unit) 14, the optical engine unit 13 housing optical components to project a screen image 16 on a screen 15, the control unit 14 housing a board or the like that controls the optical components in the optical engine unit 13.

Figure 2:
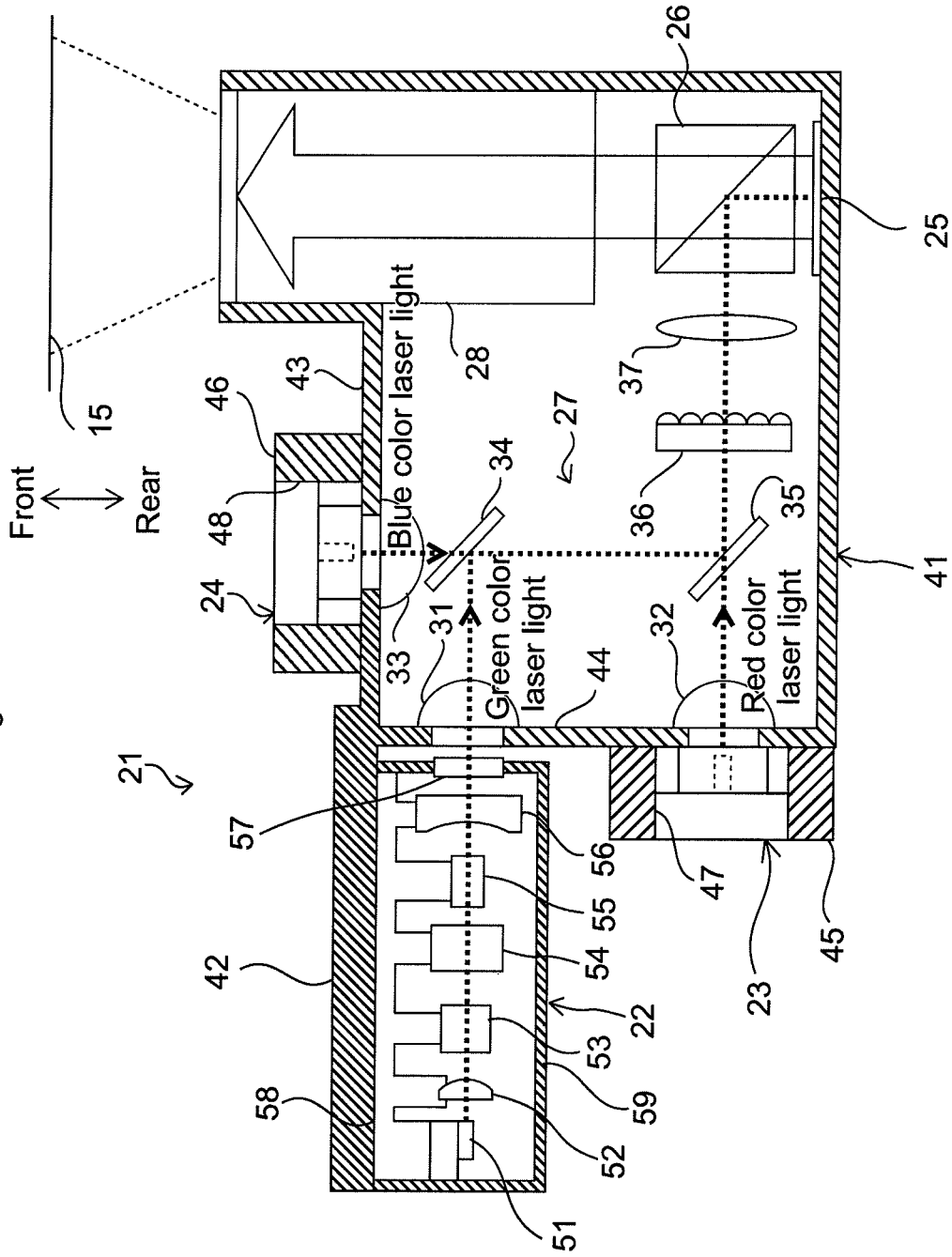
FIG. 2 schematically illustrates a configuration of an optical engine installed in an optical engine unit of the image display apparatus according to the present invention.

FIG. 2 schematically illustrates a configuration of an optical engine 21 installed in the optical engine unit 13. The optical engine 21 has a green color laser light source apparatus 22 emitting green color laser light; a red color laser light source apparatus 23 emitting red color laser light; a blue color laser light source apparatus 24 emitting blue color laser light; a liquid crystal reflective type light modulator 25 modulating the laser light emitted from each of the laser light source apparatuses 22 to 24, according to image signals; a polarization beam splitter 26 reflecting the laser light emitted from each of the laser light source apparatuses 22 to 24 and radiating the laser light onto the light modulator 25, and transmitting the modulated laser light emitted from the light modulator 25; a relay optical system 27 guiding the laser light emitted from each of the laser light source apparatuses 22 to 24 to the polarization beam splitter 26; and a projection optical system 28 projecting on the screen the modulated laser light that has been transmitted through the polarization beam splitter 26.

The optical engine 21 displays a color image in a field sequential system. Laser light of each color is sequentially emitted from each of the laser light source apparatuses 22 to 24 on a time division basis. Images of the laser light of each color are recognized as a color image due to a residual image effect.

The relay optical system 27 includes collimator lenses 31 to 33; a first dichroic mirror 34 and a second dichroic mirror 35; a diffuser panel 36; and a field lens 37. The collimator lenses 31 to 33 convert the laser light having respective colors into a parallel beam, the laser light being emitted from the laser light source apparatuses 22 to 24, respectively. The first dichroic mirror 34 and the second dichroic mirror 35 guide the laser light having respective colors in a predetermined direction, the laser light having passed through the collimator lenses 31 to 33. The diffuser panel 36 diffuses the laser light guided by the dichroic mirrors 34 and 35. The field lens 37 converts the laser light having passed through the diffuser panel 36 into a converging laser.

When a side on which the laser light is emitted from the projection optical system 28 toward the screen is a front side, the blue color laser light is emitted rearward from the blue color laser light source apparatus 24. The green color laser light is emitted from the green color laser light source apparatus 22 and the red color laser light is emitted from the red color laser light source apparatus 23, such that an optical axis of the green color laser light and an optical axis of the red color laser light each orthogonally intersect with an optical axis of the blue color laser light. The blue color laser light, the red color laser light, and the green color laser light are guided to the same optical path by the two dichroic mirrors 34 and 35. Specifically, the blue color laser light and the green color laser light are guided to the same optical path by the first dichroic mirror 34; and the blue color laser light, the green color laser light, and the red color laser light are guided to the same optical path by the second dichroic mirror 35.

Each of the first dichroic mirror 34 and the second dichroic mirror 35 is provided with a film on a surface thereof to transmit and reflect laser light having a predetermined wavelength. The first dichroic mirror 34 transmits the blue color laser light and reflects the green color laser light. The second dichroic mirror 35 transmits the red color laser light and reflects the blue color laser light and the green color laser light.

The optical members above are supported by a case 41. The case 41 acts as a heat dissipater dissipating heat generated at the laser light source apparatuses 22 to 24. The case 41 is formed of a highly thermally conductive material, such as aluminum or copper.

The green color laser light source apparatus 22 is mounted to a mounting portion 42, which is provided to the case 41 in a state projecting to a side. The mounting portion 42 is provided projecting orthogonally to a side wall 44 from a corner where a front wall 43 and the side wall 44 intersect, the front wall 43 being positioned in the front of a housing space of the relay optical system 27, the side wall 24 being positioned on the side of the housing space. The red color laser light source apparatus 23 is mounted on an external surface of the side wall 44 in a state being held by a holder 45. The blue color laser light source apparatus 24 is mounted on an external surface of the front wall 43 in a state being held by a holder 46.

The red color laser light source apparatus 23 and the blue color laser light source apparatus 24 are provided in a can package, in which a laser chip emitting laser light is disposed, such that an optical axis is positioned on a central axis of a can-shaped external portion in a state where the laser chip is supported by a stem. The laser light is emitted through a glass window provided to an opening of the external portion. The red color laser light source apparatus 23 and the blue color laser light source apparatus 24 are press-fitted into attachment holes 47 and 48, respectively, which are provided in the holders 45 and 46, respectively. The red color laser light source apparatus 23 and the blue color laser light source apparatus 24 are thus fixed to the holders 45 and 46, respectively. Heat generated by the laser chips of the red color laser light source apparatus 23 and the blue color laser light source apparatus 24 is transferred through the holders 45 and 46, respectively, to the case 41 and dissipated. The holders 45 and 46 are formed of a highly thermally conductive material, such as aluminum or copper.

The green color laser light source apparatus 22 includes a semiconductor laser 51; an FAC (fast-axis collimator) lens 52; a rod lens 53; a solid-laser element 54; a wavelength conversion element 55; a concave mirror 56; a glass cover 57; a base 58 supporting the components; and a cover body 59 covering the components. The semiconductor laser 51 emits excitation laser light. The FAC lens 52 and the rod lens 53 are collecting lenses that collect the excitation laser light emitted from the semiconductor laser 51. The solid-laser element 54 is excited by the excitation laser light and emits fundamental laser light (infrared laser light). The wavelength conversion element 55 converts a wavelength of the fundamental laser light and emits half wavelength laser light (green color laser light). The concave mirror 56 constitutes a resonator with the solid-laser element 54. The glass cover 57 prevents leakage of the excitation laser light and fundamental wavelength laser light.

The base 58 of the green color laser light source apparatus 22 is fixed to the mounting portion 42 of the case 41. A space having a predetermined width (0.5 mm or less, for example) is provided between the green color laser light source apparatus 22 and the side wall 44 of the case 41. Thereby, the heat of the green color laser light source apparatus 22 becomes less likely to be transferred to the red color laser light source apparatus 23. The temperature of the red color laser light source apparatus 23 is then inhibited from increasing. The red color laser light source apparatus 23, which has undesirable temperature properties, can thus be stably operated. Furthermore, in order to secure a predetermined margin for optical axis adjustment (approximately 0.3 mm, for example) of the red color laser light source apparatus 23, a space having a predetermined width (0.3 mm or more, for example) is provided between the green color laser light source apparatus 22 and the red color laser light source apparatus 23.

Figure 3:
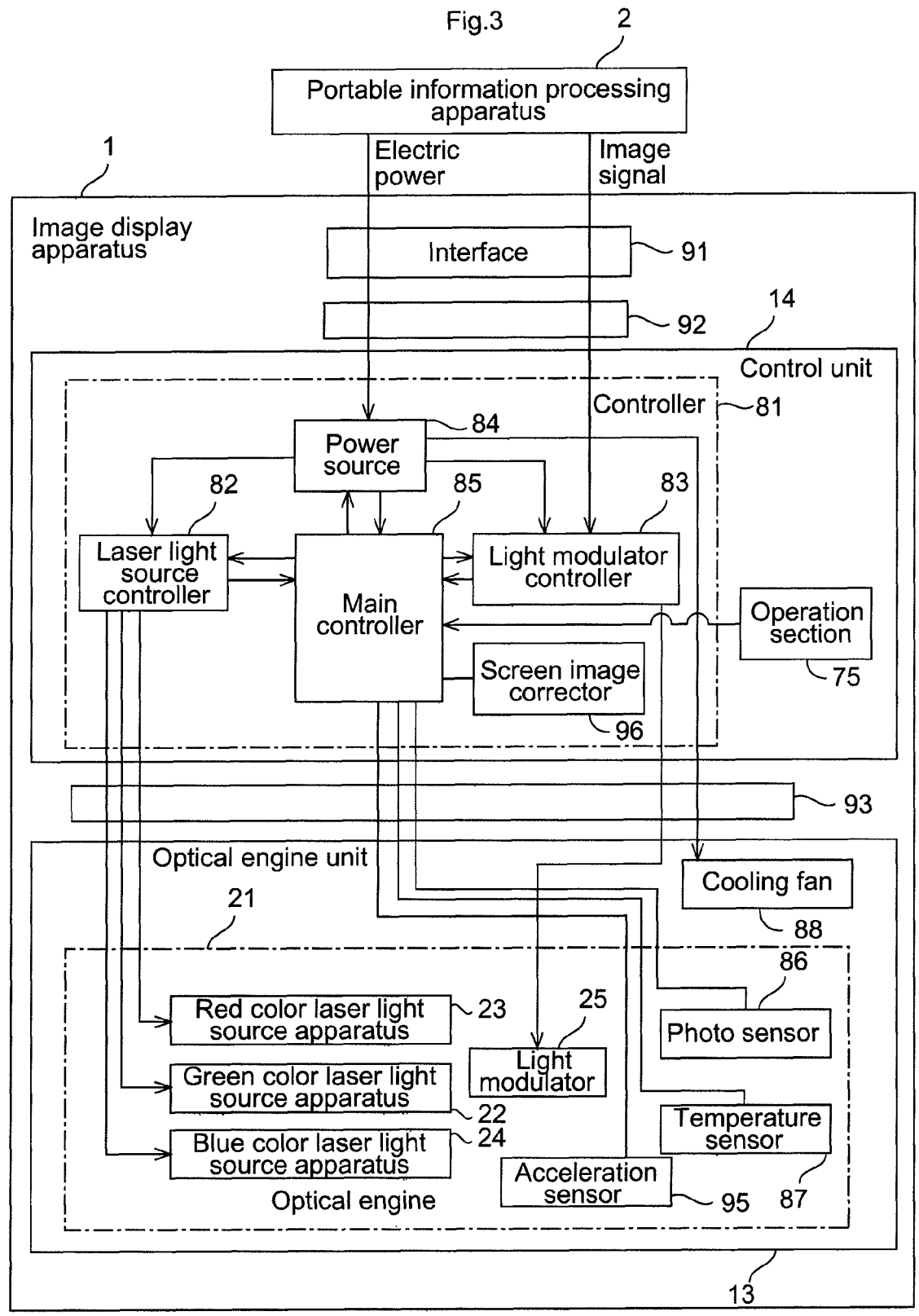
FIG. 3 is a block diagram schematically illustrating a configuration of the image display apparatus according to the present invention.
Figure 4A:
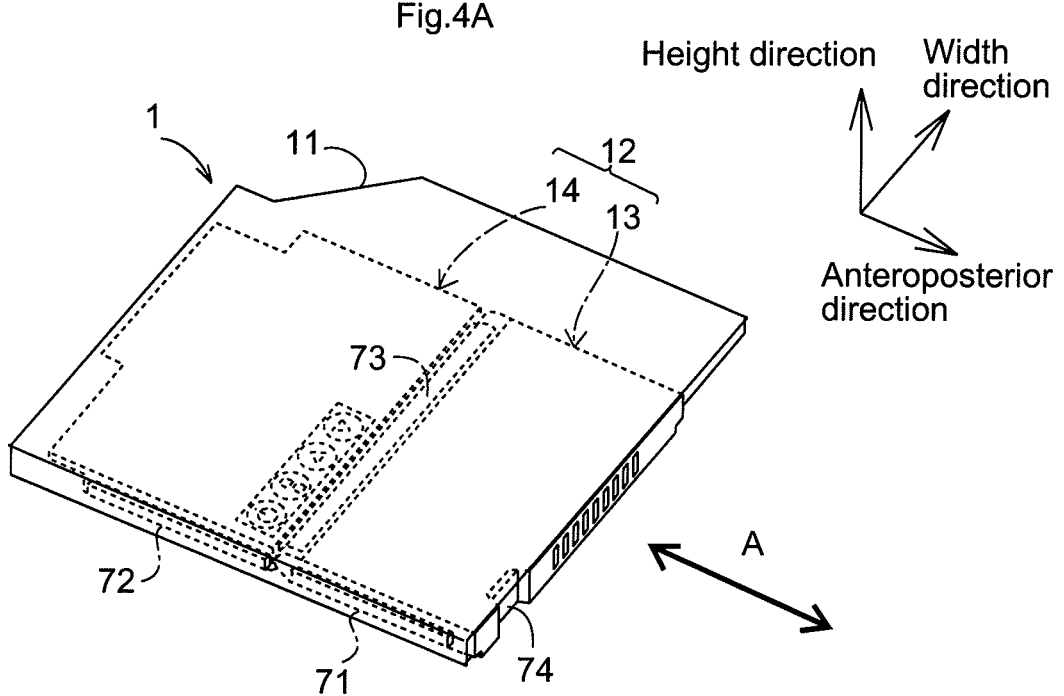
FIGS. 4A and 4B are each a perspective view illustrating the image display apparatus according to the present invention.
Figure 4B:
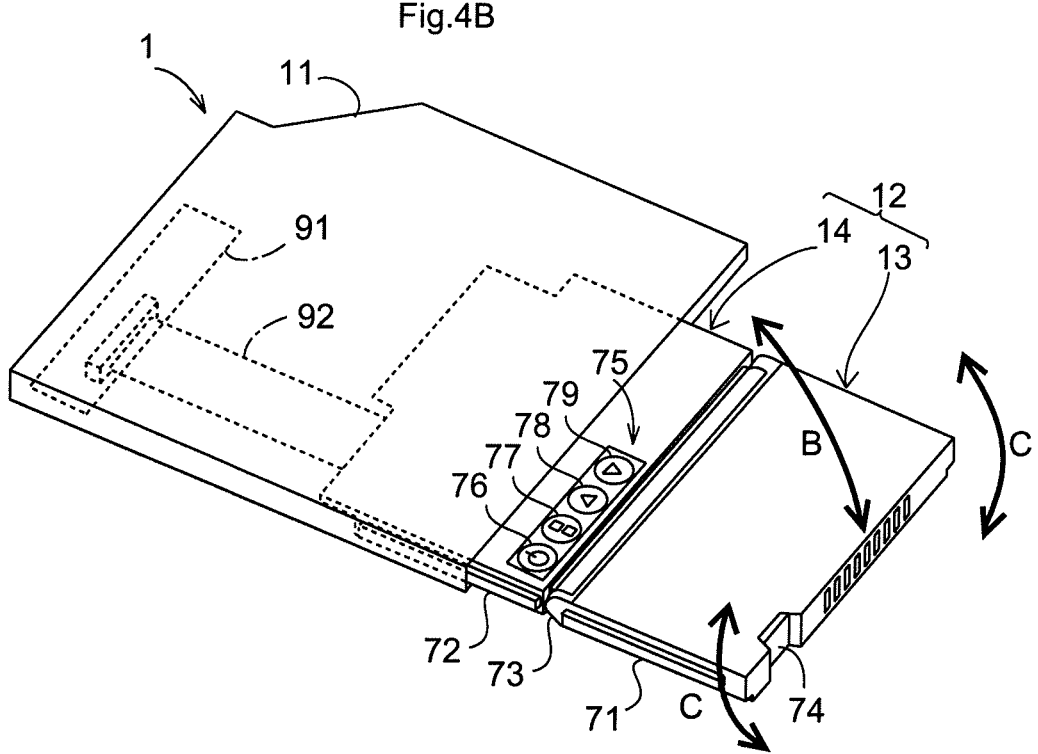

FIG. 3 is a block diagram schematically illustrating a configuration of the image display apparatus 1. FIGS. 4A and 4B are each a perspective view of the image display apparatus 1. FIG. 4A illustrates a stored state in which the portable body 12 is stored in the case 11. FIG. 4B illustrates a used state in which the portable body 12 is pulled out from the case 11.

As shown in FIG. 3, a controller 81 of the image display apparatus 1 has a laser light source controller 82, a light modulator controller 83, a power source 84, and a main controller 85. The laser light source controller 82 controls the laser light source apparatuses 22 to 24 of the respective colors. The light modulator controller 83 controls the light modulator 25 based on image signals input from the portable information processing apparatus 2. The power source 84 supplies power supplied from the portable information processing apparatus 2 to the laser light source controller 82 and the light modulator controller 83. The main controller 85 comprehensively controls the components. The controller 81 is provided in the control unit 14.

In addition to the laser light source apparatuses 22 to 24 of the respective colors and the light modulator 25, the optical engine 21 has a photo sensor 86 and a temperature sensor 87, the photo sensor 86 detecting the light intensity incident to the light modulator 25, the temperature sensor 87 detecting the temperature in the vicinity of the light modulator 25. The optical engine 21 is provided in the optical engine unit 13, which also includes a cooling fan 88 that cools the optical engine 21.

In the case 11 (refer to FIGS. 4A and 4B) of the image display apparatus 1, an interface 91 is provided to which a power supply line and a signal line are connected, the power supply line supplying power from the portable information processing apparatus 2, the signal line transmitting image signals from the portable information processing apparatus 2. The interface 91 and the control unit 14 are connected by a wiring cable 92. The wiring cable 92 is flexible and thus bends and deforms following the control unit 14 when the portable body 12 is inserted to/removed from the case 11.

The control unit 14 and the optical engine unit 13 are connected by a wiring cable 93. The wiring cable 93 includes a signal line and a power supply line, the signal line transmitting and receiving signals between the components in the controller 81 and the components in the optical engine 21, the power supply line supplying power to the cooling fan 88 and the like. The wiring cable 93 is also flexible and thus bends and deforms according to rotation of the optical engine unit 13 when the optical engine unit 13 is rotated relative to the control unit 14.

The controller 81 is provided in the control unit 14 in the embodiment. A portion of the controller 81, such as, for example, the power source 84, may be provided in the case 11 along with the interface 91.

The optical engine 21 in the optical engine unit 13 has an acceleration sensor (projection angle detector) 95. As shown in FIGS. 4A and 4B, the acceleration sensor 95 obtains a projection angle, specifically a tilt angle of an optical axis of projected light relative to the horizontal direction, the projected light being emitted from an emission window 74 of the optical engine unit 13. The acceleration sensor 95 will be described in detail below.

As shown in FIG. 3, the controller 81 has a screen image corrector 96 that corrects trapezoidal distortion caused when a screen image is projected from an angle relative to a screen. The screen image corrector 96 performs a scalar process (pixel conversion) in which a rectangular output screen image is converted into a trapezoidal shape in an inverse direction to the trapezoidal distortion of the screen image projected on the screen through decimation or interpolation of pixels. Trapezoidal distortion is corrected based on the tilt angle obtained from output signals from the acceleration sensor 95. The process will be described in detail below.

As shown in FIGS. 4A and 4B, the cases of the optical engine unit 13 and the control unit 14, which are included in the portable body 12, each have a flat box shape having a short height. On two side edges of each of the cases of the optical engine unit 13 and the control unit 14, sliders 71 and 72 are provided so as to slide along guide rails (not shown in the drawings) provided inside the case 11. Pushing and pulling by a user inserts and removes the portable body 12 to and from the case 11 as shown with an arrow A.

The optical engine unit 13 and the control unit 14 are connected through a hinge 73, such that the optical engine unit 13 is rotatably supported by the control unit 14. The optical engine unit 13 has the emission window 74 in an end portion opposite to the hinge 73. The laser light passing through the projection optical system 28 of the optical engine 21 (refer to FIG. 2) is emitted from the emission window 74.

As shown in FIG. 1, the housing space of the image display apparatus 1 is open to a side surface of the case 8 of the portable information processing apparatus 2, such that the portable body 12 is inserted to and removed from the side surface of the case 8 of the portable information processing apparatus 2 in a substantially orthogonal direction. The case 11 of the image display apparatus 1 is housed in the case 8 of the portable information processing apparatus 2. The optical engine unit 13 and a portion of the control unit 14 project to the side of the case 8 of the portable information processing apparatus 2 during use. The side surface of the portable information processing apparatus 2 is disposed so as to face the screen from the front, and thus the emission window 74 in the optical engine unit 13 faces the screen from the front.

The hinge 73 shown in FIGS. 4A and 4B has an orthogonal biaxial structure. In the used state shown in FIG. 4B, while the control unit 14 is supported by the guide rails of the case 11, the optical engine unit 13 can be completely pulled out from the case 11 so as to be rotated in a vertical direction as shown with an arrow B and in an anteroposterior direction, that is, around the axis in the insertion/removal direction of the portable body 12 as shown with an arrow C.

An operation section 75 is provided in an upper surface of the control unit 14. The operation section 75 includes a power button 76, a brightness switch button 77, and two trapezoidal distortion correction buttons 78 and 79.

Figure 5A:
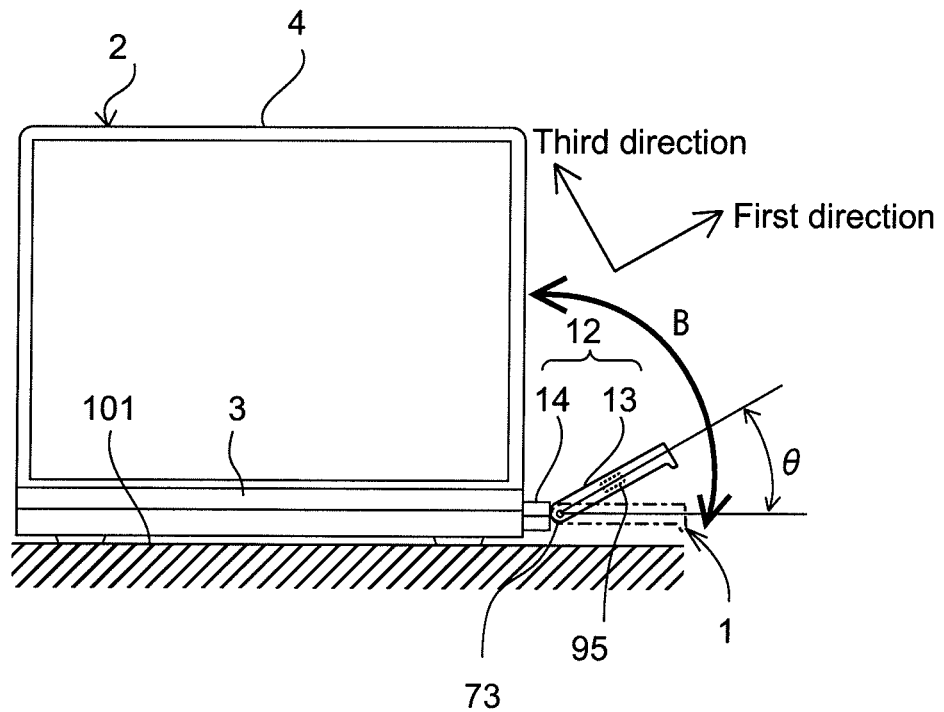
FIGS. 5A and 5B each illustrate the image display apparatus and the portable information processing apparatus according to the present invention.
Figure 5B:
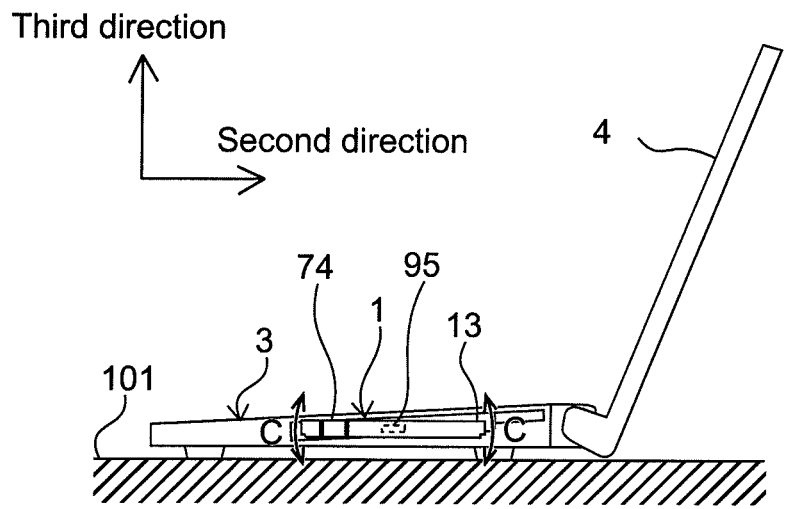

FIGS. 5A and 5B each illustrate the image display apparatus 1 and the portable information processing apparatus 2. FIG. 5A is a front view of the portable information processing apparatus 2. FIG. 5B is a side view of the portable information processing apparatus 2.

As described above, the optical engine unit 13 is rotatably supported by the control unit 14 through the hinge 73. The optical engine unit 13 rotates in a direction so as to vertically change the projection angle, specifically the tilt angle of the optical axis of the projected light with respect to the horizontal direction, the projected light being emitted from the emission window 74 of the optical engine unit 13. Rotating the optical engine 21 adjusts the projection angle.

The acceleration sensor 95 provided to the optical engine unit 13 is a triaxial sensor that can detect acceleration in three mutually orthogonally intersecting directions. The acceleration sensor 95 detects: a first direction that is a direction along the optical axis of the projected light emitted from the emission window 74 of the optical engine unit 13; a second direction that is a direction along a rotational axis of the hinge 73; and a third direction that is a direction orthogonally intersecting with both the first direction and the second direction.

The main controller 85 of the controller 81, shown in FIG. 3, calculates a projection angle θ based on the acceleration of the first direction and the third direction detected by the acceleration sensor 95. The screen image corrector 96 corrects trapezoidal distortion of a screen image according to the calculated projection angle θ. When the acceleration sensor 95 is still, the acceleration sensor 95 detects gravitational acceleration components in the first and the third directions, thereby obtaining the projection angle θ.

As shown in FIG. 5B, the image display apparatus 1 is attached to the portable information processing apparatus 2 in a tilted state following the upper surface of the main body 3, to which a keyboard is provided. The optical engine unit 13 is rotatable in a direction shown with an arrow C. By setting the direction of the optical engine unit 13 as a horizontal direction, a longitudinal direction and a lateral direction of a screen image are appropriately displayed on the screen as a horizontal direction and a vertical direction, respectively.

Figure 7:
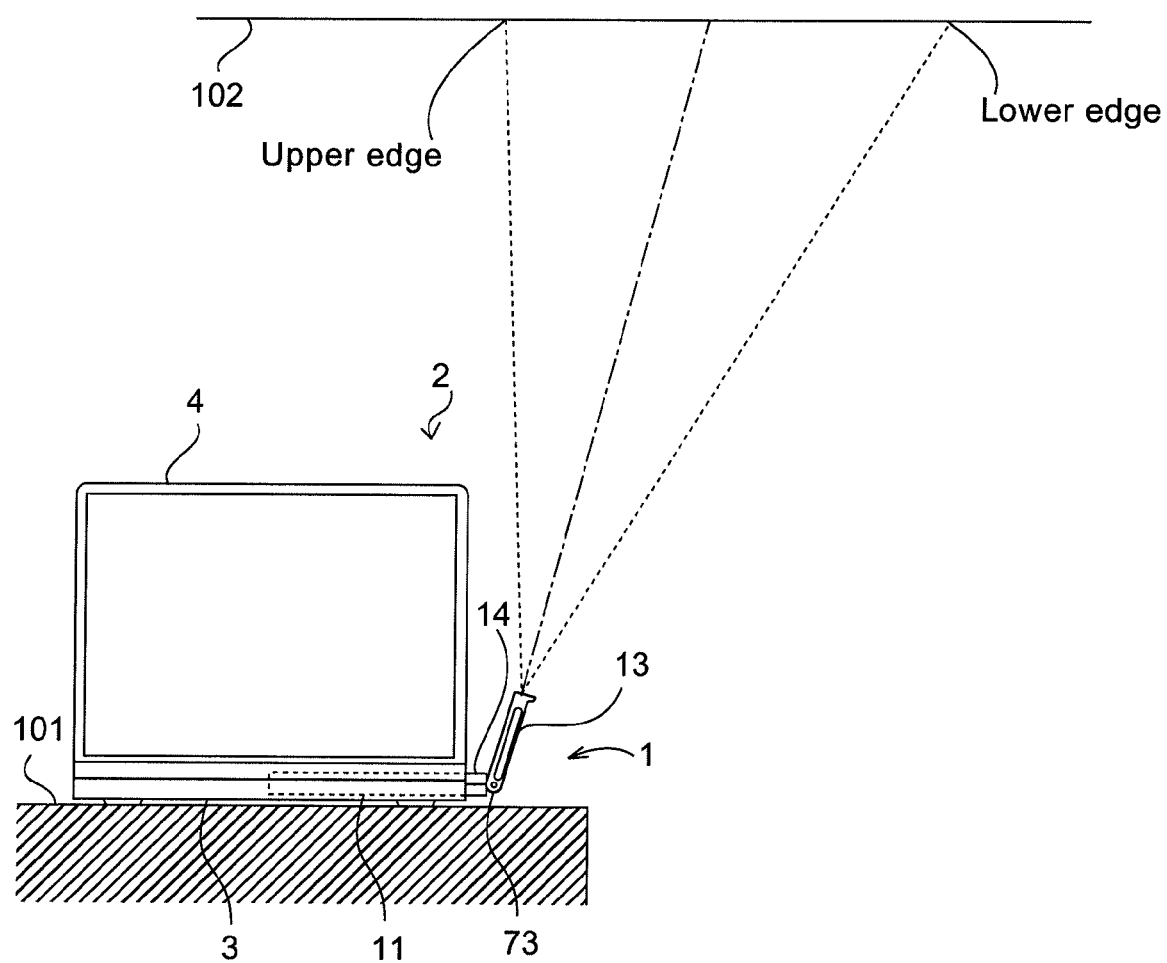
FIG. 7 is a side view illustrating a state in which a screen image is projected obliquely upward to a ceiling as a screen.

FIG. 6 is a side view illustrating a state in which the portable information processing apparatus 2 is placed on a stand 100 and a screen image is projected obliquely upward to a wall 101 as a screen. FIG. 7 is a side view illustrating a state in which a screen image is projected obliquely upward to a ceiling 102 as a screen.

As shown in FIG. 5A, the optical engine unit 13 is rotatably supported by the control unit 14, such that the optical engine unit 13 rotates in a vertical direction as shown with an arrow B. Rotating the optical engine unit 13 adjusts the projection angle. Particularly in this embodiment, the optical engine unit 13 can be rotated upward by 90°. Changing the projection angle in a range from 0° to 90° allows projection of a screen image to the wall 101 as a screen as shown in FIG. 6, and projection of the screen image to the ceiling 102 as a screen as shown in FIG. 7.

In the case of projecting the screen image obliquely to the wall 101 and the ceiling 102, as shown in FIG. 6 and FIG. 7, respectively, the distance to the wall 101 and the ceiling 102 is different between the upper edge and the lower edge of the projected screen image. Thus, the rectangular output screen image is displayed on the wall 101 and the ceiling 102 in a trapezoidal shape having the upper edge and the lower edge of different lengths, requiring trapezoidal distortion correction.

Figure 8:
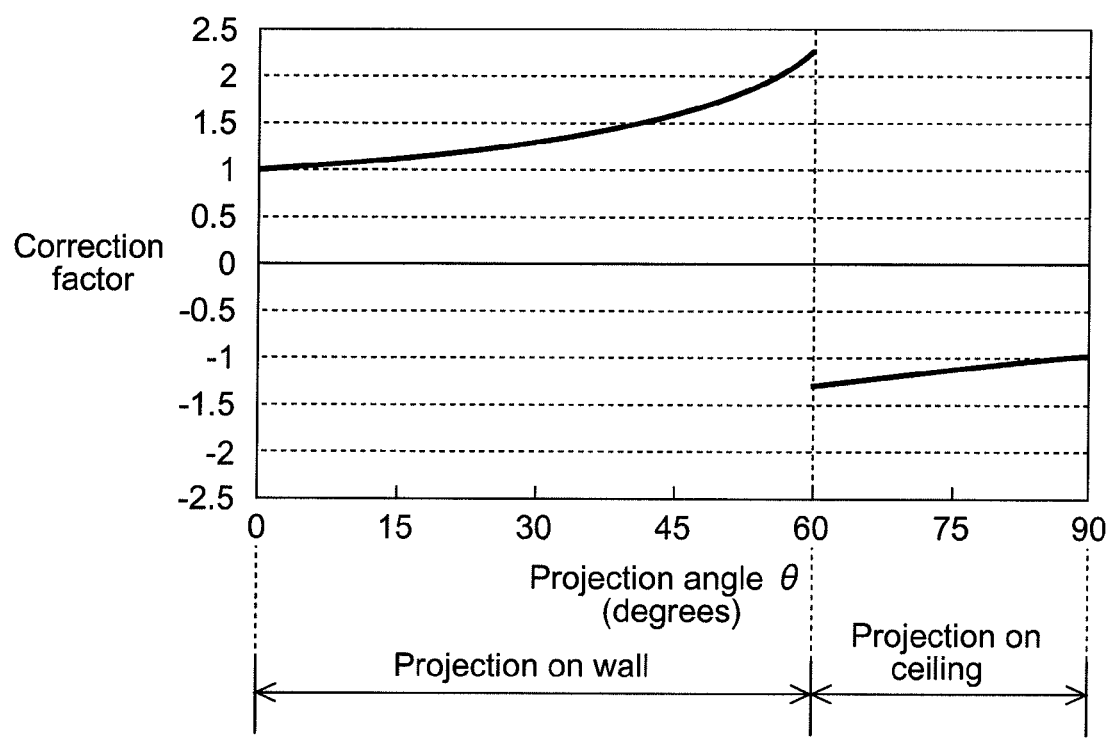
FIG. 8 illustrates a relationship between a correction factor used to correct trapezoidal distortion and a projection angle θ.

FIG. 8 illustrates a relationship between a correction factor used to correct trapezoidal distortion and a projection angle θ. The projection angle θ is the tilt angle of the optical axis of the projected light relative to the horizontal direction, the projected light being emitted from the emission window 74 of the optical engine unit 13 (refer to FIG. 5A).

The screen image corrector 96 shown in FIG. 3 corrects trapezoidal distortion using the correction factor shown in FIG. 8. In the embodiment, an amount of trapezoidal distortion correction is changed according to the projection angle θ indicated by an output value of the acceleration sensor 95. Based on the projection angle θ, a projection mode is determined from between projection on the wall and projection on the ceiling. According to the projection mode, a direction of trapezoidal distortion correction is changed.

The correction factor represents a ratio of the upper edge and the lower edge of the projected screen image displayed in a trapezoidal shape. With a projection angle θ of 0, specifically projection of a screen image straight to the side, the correction factor is 1 and trapezoidal distortion correction is not performed. An absolute value of the correction factor increases as the projection angle θ increases from 0° in the case of projection on the wall, and increases as the projection angle θ decreases from 90° in the case of projection on the ceiling. The amount of trapezoidal distortion correction increases according to the absolute value of the correction factor. Thus, screen image distortion that becomes pronounced with a change in the projection angle θ can be appropriately corrected.

The sign preceding the correction factor defines the direction of trapezoidal distortion correction. A positive sign represents compression on the upper edge portion of the screen image, and a negative sign represents compression on the lower edge portion of the screen image. According to the sign of the correction factor determined by the projection mode, the upper edge portion or the lower edge portion of the screen image is compressed. Specifically, in the case of projection on the wall, the correction factor is positive and the upper edge portion of the screen image is compressed. In the case of projection on the ceiling, the correction factor is negative and the lower edge portion of the screen image is compressed.

To correct trapezoidal distortion, the upper edge portion or the lower edge portion of the screen image is compressed in the embodiment. A method of correcting trapezoidal distortion is not limited to this. As long as a projected screen image displayed on a screen is corrected so as not to be distorted, a variety of publicly known methods may be employed.

The trapezoidal distortion correction buttons 78 and 79 shown in FIGS. 4A and 4B are provided to manually correct trapezoidal distortion. For example, in the case where a projected screen image is still distorted after having undergone automatic trapezoidal distortion correction based on the projection angle, the screen image can be finely tuned to correct trapezoidal distortion. One of these two buttons 78 and 79 is used to increase the amount of trapezoidal distortion correction and the other is used to decrease the amount of trapezoidal distortion correction.

FIGS. 9A to 9D each illustrate an output screen image of the image display apparatus 1 and a projected screen image on the wall 101 in the case where the screen image is projected obliquely upward to the wall 101 as a screen. FIGS. 10A to 10D each illustrate an output screen image of the image display apparatus 1 and a projected screen image on the ceiling 102 in the case where the screen image is projected obliquely upward to the ceiling 102 as a screen.

Figure 9A:
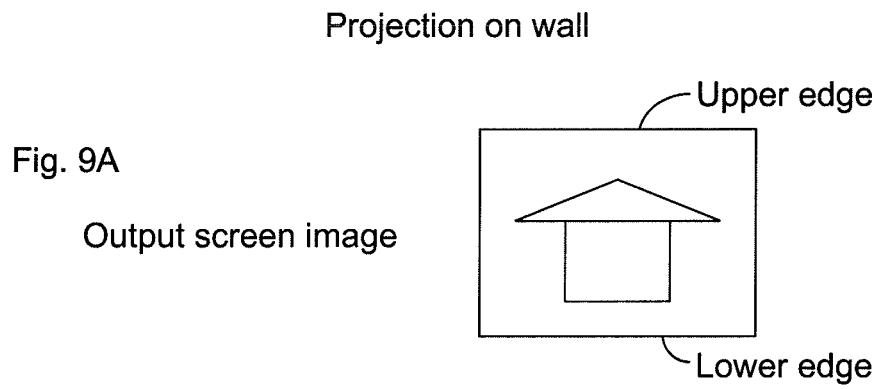
FIGS. 9A to 9D each illustrate a state of a screen image in a case of projection on the wall.
Figure 9B:
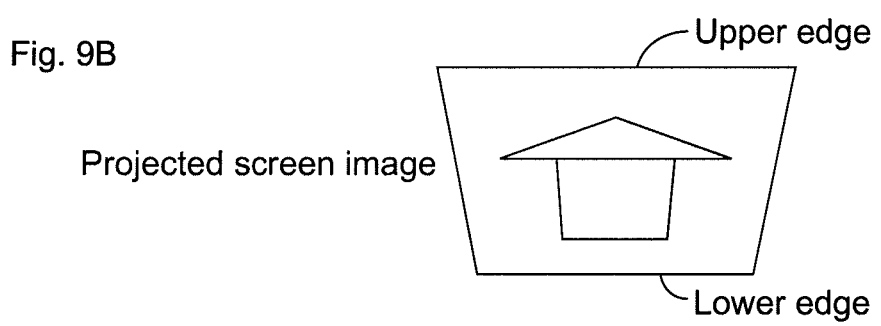

In projection on the wall shown in FIG. 6, the distance to the wall 101 is greater on the upper edge of the projected screen image. Thus, the rectangular output screen image shown in FIG. 9A projected as-is on the wall 101 is displayed in a trapezoidal shape having the upper edge longer than the lower edge as shown in FIG. 9B.

Figure 9C:
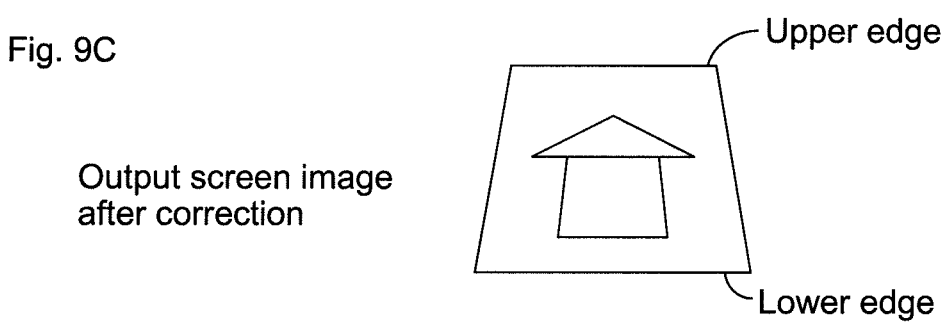
Figure 9D:
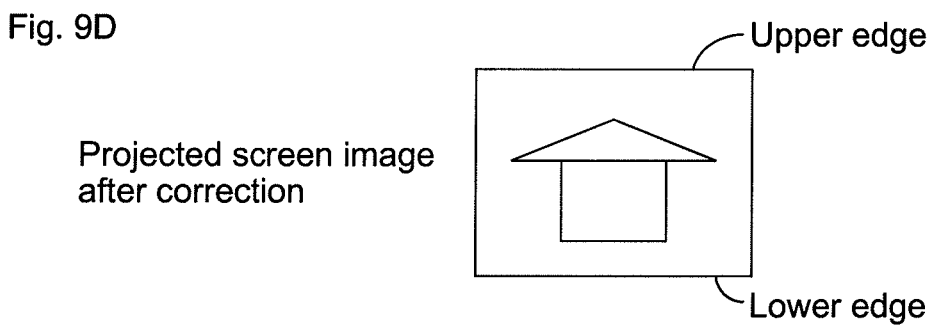

In trapezoidal distortion correction using the correction factor shown in FIG. 8, the correction factor is positive for projection on the wall, and thus the upper edge portion of the screen image is compressed. The corrected output screen image has a trapezoidal shape having the upper edge shorter than the lower edge, as shown in FIG. 9C. Thus, the screen image projected on the wall 101 has an undistorted rectangular screen image having the upper edge and the lower edge of the same length, as shown in FIG. 9D.

Figure 10A:
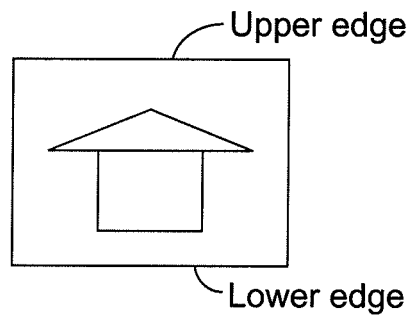
FIGS. 10A to 10D each illustrate a state of a screen image in a case of projection on the ceiling.
Figure 10B:
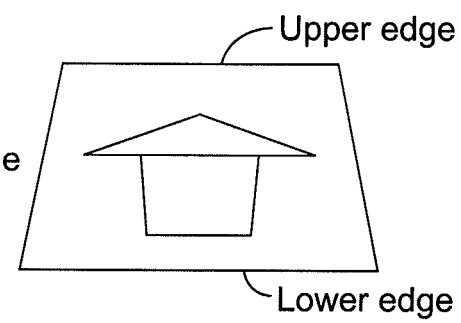

In the projection on the ceiling shown in FIG. 7, the distance to the ceiling 102 is greater on the lower edge of the projected screen image. Thus, the rectangular output screen image shown in FIG. 10A projected on the ceiling 102 is displayed in a trapezoidal shape having the lower edge longer than the upper edge as shown in FIG. 10B.

Figure 10C:
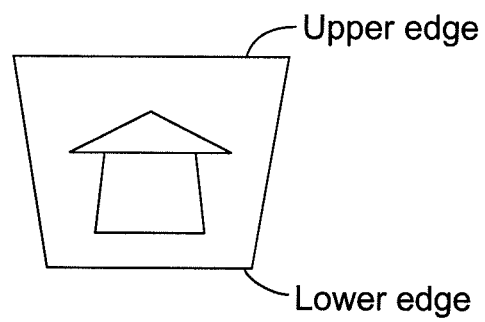
Figure 10D:
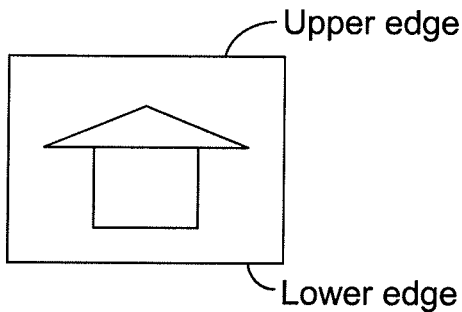

In trapezoidal distortion correction using the correction factor shown in FIG. 8, the correction factor is negative for projection on the ceiling, and thus the lower edge portion of the screen image is compressed. The corrected output screen image has a trapezoidal shape having the lower edge shorter than the upper edge, as shown in FIG. 10C. Thus, the screen image projected on the ceiling 102 has an undistorted rectangular screen image having the upper edge and the lower edge of the same length, as shown in FIG. 10D.

Figure 11A:
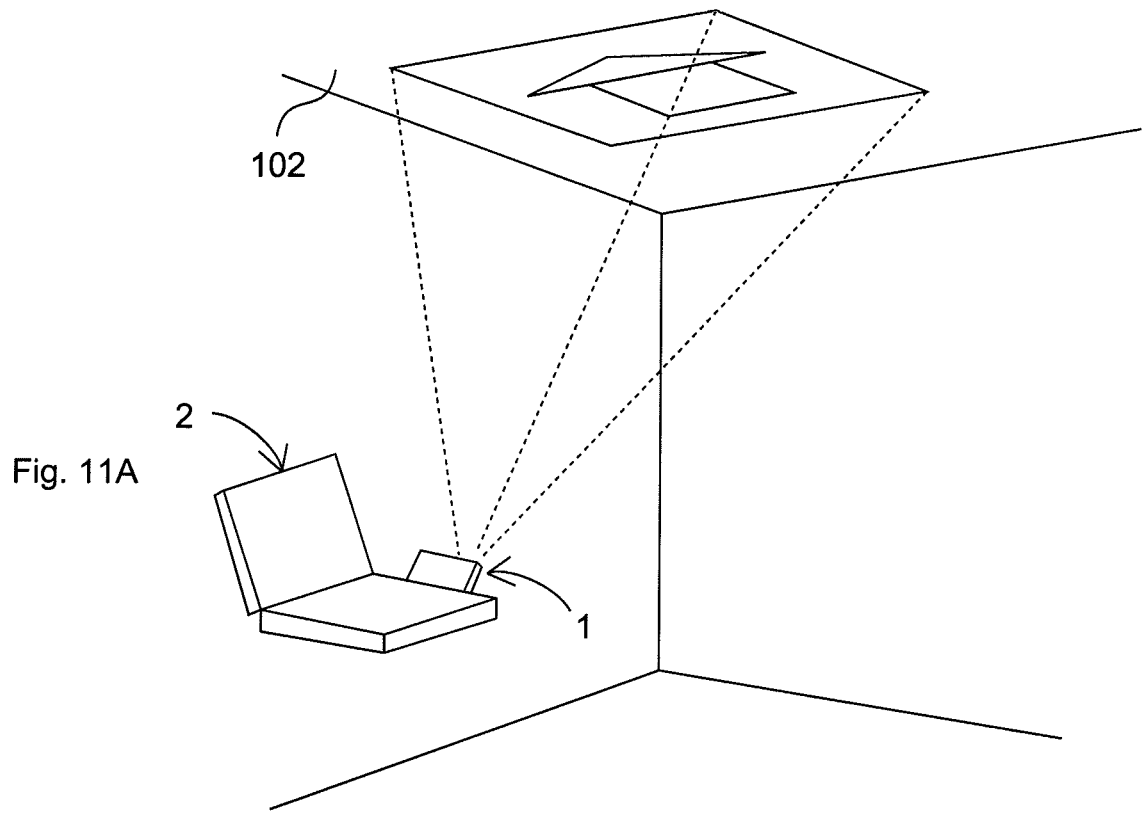
FIGS. 11A and 11B are each a perspective view illustrating an example in which a screen image is displayed in reverse in the case of projection on the ceiling.
Figure 11B:
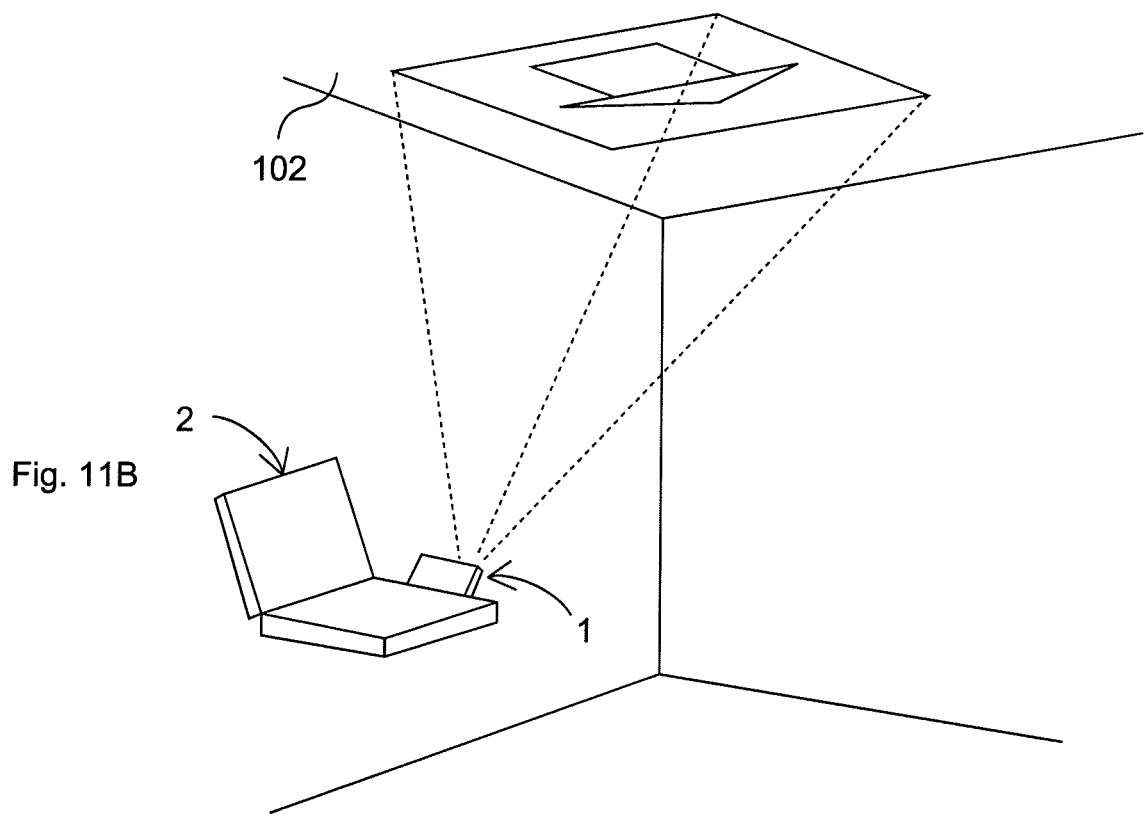

FIGS. 11A and 11B are each a perspective view illustrating an example in which a screen image is displayed in reverse in the case of projection on the ceiling. Merely correcting trapezoidal distortion in the case of projection on the ceiling as shown in FIG. 7 provides a screen image on the ceiling 102 as shown in FIG. 11A. Depending on a positional relationship between a user looking up to the ceiling 102 from below and the screen image, the screen image appears upside down. In this case, reversing the screen image as shown in FIG. 11B improves viewability. In this embodiment, reversing a screen image means rotating the screen image by 180°.

In the embodiment, the projection mode is determined from between projection on the wall and projection on the ceiling based on the projection angle indicated by an output value of the acceleration sensor 95. When the projection angle has an angle (60° or more, in this embodiment) to be determined as projection on the ceiling, a user can switch between a standard display mode and a reversed display mode by operating the trapezoidal distortion correction buttons 78 and 79 shown in FIG. 4B. In the standard display mode, a screen image is projected in a non-reversed state as shown in FIG. 11A. In the reversed display mode, a screen image is projected in a reversed state as shown in FIG. 11B.

Figure 12:
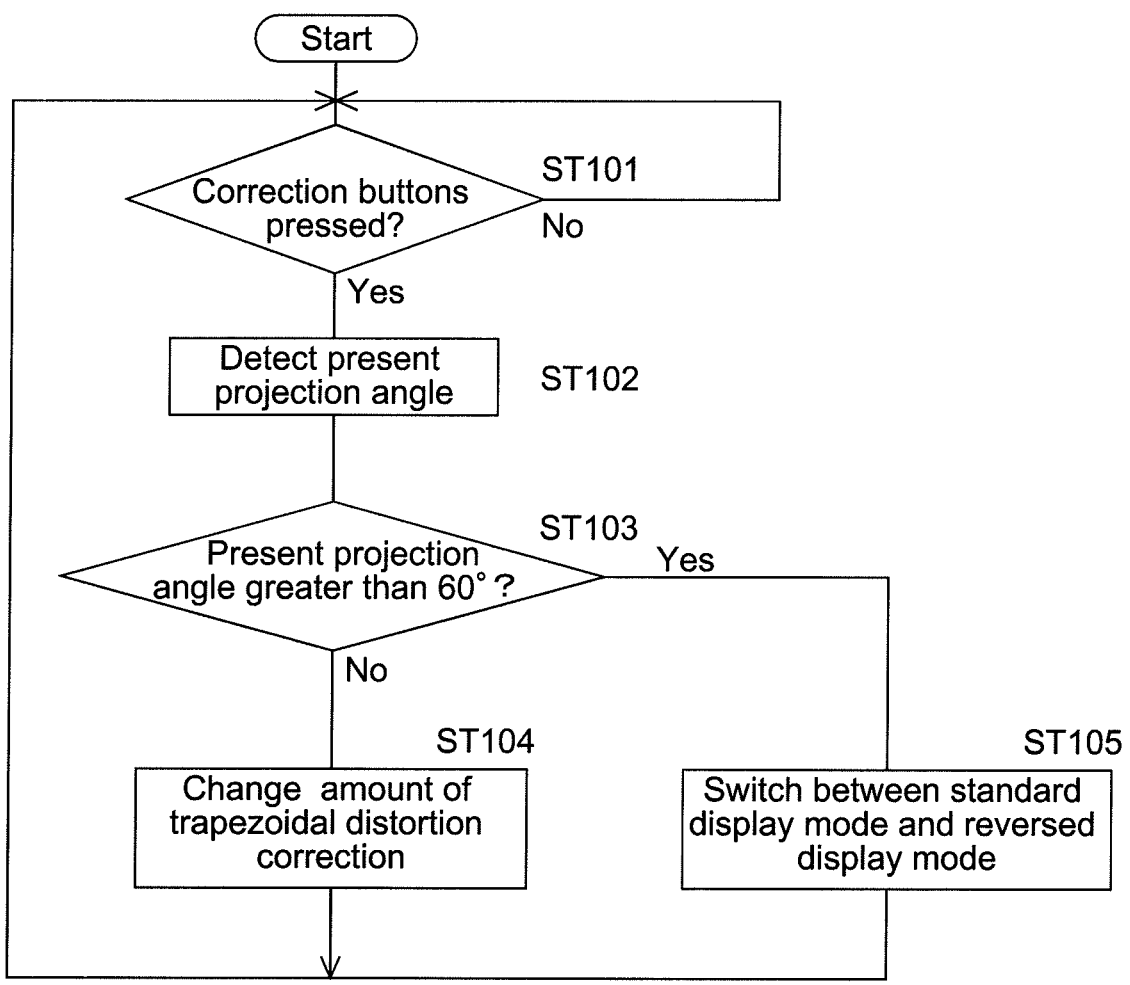
FIG. 12 is a flowchart illustrating steps of processing in operating trapezoidal distortion correction buttons.

FIG. 12 is a flowchart illustrating steps of processing in operating the trapezoidal distortion correction buttons 78 and 79. In the embodiment, when either one of the trapezoidal distortion correction buttons 78 and 79 is pressed (Yes in ST101), a present projection angle indicated by an output value of the acceleration sensor 95 is detected (ST102). Then, it is determined whether the present projection angle is greater than 60° (ST103). When the present projection angle does not exceed 60° (No in ST103), an amount of trapezoidal distortion correction is changed (ST104). On the other hand, when the present projection angle is greater than 60° (Yes in ST103), it is determined to be projection on the ceiling, and switching between the standard display mode and the reversed display mode is performed (ST105).

A reference projection angle to determine the projection mode is 60° in this embodiment. However, the reference projection angle is not limited to this and may be determined as desired.

Furthermore, in the case where the projection angle is greater than a predetermined value and the projection mode is determined to be projection on the ceiling, the two buttons 78 and 79 have the same function. Thus, by operating either one of the two buttons, switching between the standard display mode and the reversed display mode is performed.

Figure 13:
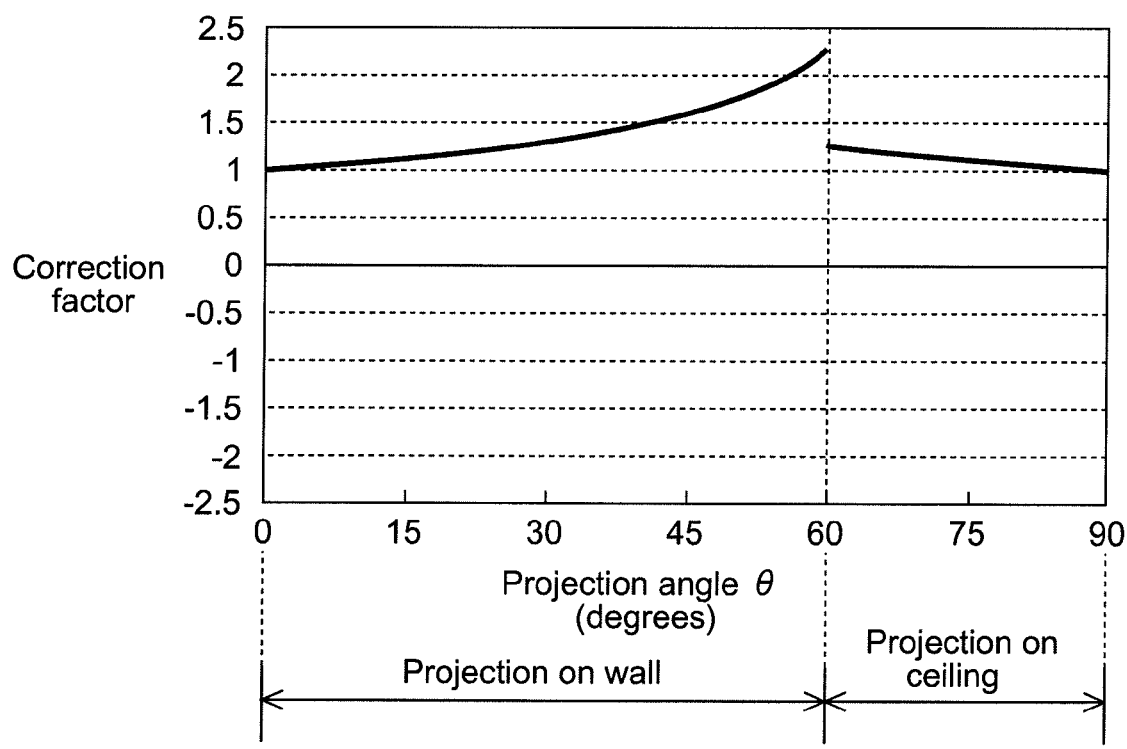
FIG. 13 illustrates a relationship between a projection angle and a correction factor in a reversed display mode.

FIG. 13 illustrates a relationship between a projection angle and a correction factor in the reversed display mode. In the case where a screen image projected on the ceiling is displayed in reverse, a positional relationship between the upper edge and the lower edge is reversed. Thus, trapezoidal distortion correction in the case of projection on the ceiling is performed in a manner reverse to the example shown in FIG. 8. Specifically, the correction factor is positive and the upper edge portion of the screen image is compressed.

Figure 14A:
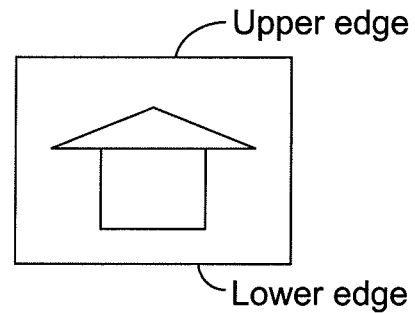
FIGS. 14A to 14D each illustrate a state of a screen image in the reversed display mode in the case of projection on the ceiling.
Figure 14B:
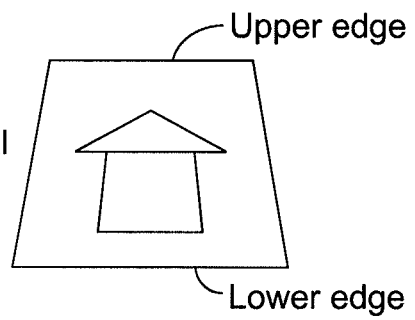
Figure 14C:
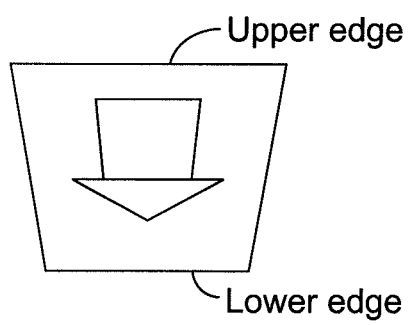
Figure 14D:
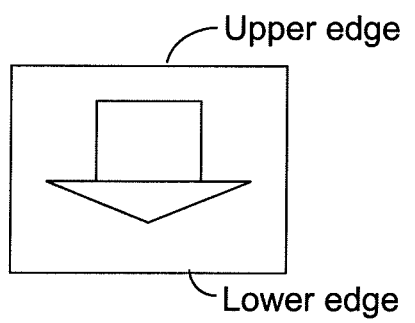

FIGS. 14A to 14D each illustrate a state of a screen image in the reversed display mode in the case of projection on the ceiling. In the case of projection on the ceiling, the correction factor is positive and the upper edge portion of the screen image is compressed as shown in FIG. 14B. Then, the screen image is rotated upside down as shown in FIG. 14C. Thus, the output screen image projected on the ceiling 102 is a vertically reversed rectangular screen image with no distortion, as shown in FIG. 14D.

An automatic adjustment to change an amount of trapezoidal distortion correction according to a projection angle is performed regardless of the projection angle. In the case where the projection angle is greater than a predetermined value and the projection mode is thus determined to be projection on the ceiling, the function of the buttons 78 and 79 is changed so as to be used to switch the display mode. Thus, the buttons 78 and 79 cannot be used to finely tune the trapezoidal distortion correction. In the case of projection on the ceiling, however, a screen image is projected to the ceiling more or less directly upward; thus, the projection angle becomes substantially 90° in many cases. In these cases, trapezoidal distortion is relatively small; thus there is no problem even when the trapezoidal distortion correction cannot be finely tuned.

Further, in the case where the projection angle is smaller than a predetermined value, the function of the buttons 78 and 79 is changed back so as to be used to change the amount of trapezoidal distortion correction. Thus, the buttons 78 and 79 cannot be used to switch between the standard display mode and the reversed display mode. Thus, a circumstance arises where, when the projection angle is decreased in the reversed display mode at the time of changing the projection mode from projection on the ceiling to projection on the wall, the display mode remains in the reversed display mode without returning to the standard display mode.

To address the circumstance, in the reversed display mode displaying a screen image in reverse in the case of projection on the ceiling in the present embodiment, when the projection angle indicated by an output value of the acceleration sensor 95 has a value (60° or less, in the embodiment) to be determined as projection on the wall, the display mode is automatically switched from the reversed display mode to the standard display mode displaying a screen image without reversal.

Figure 15:
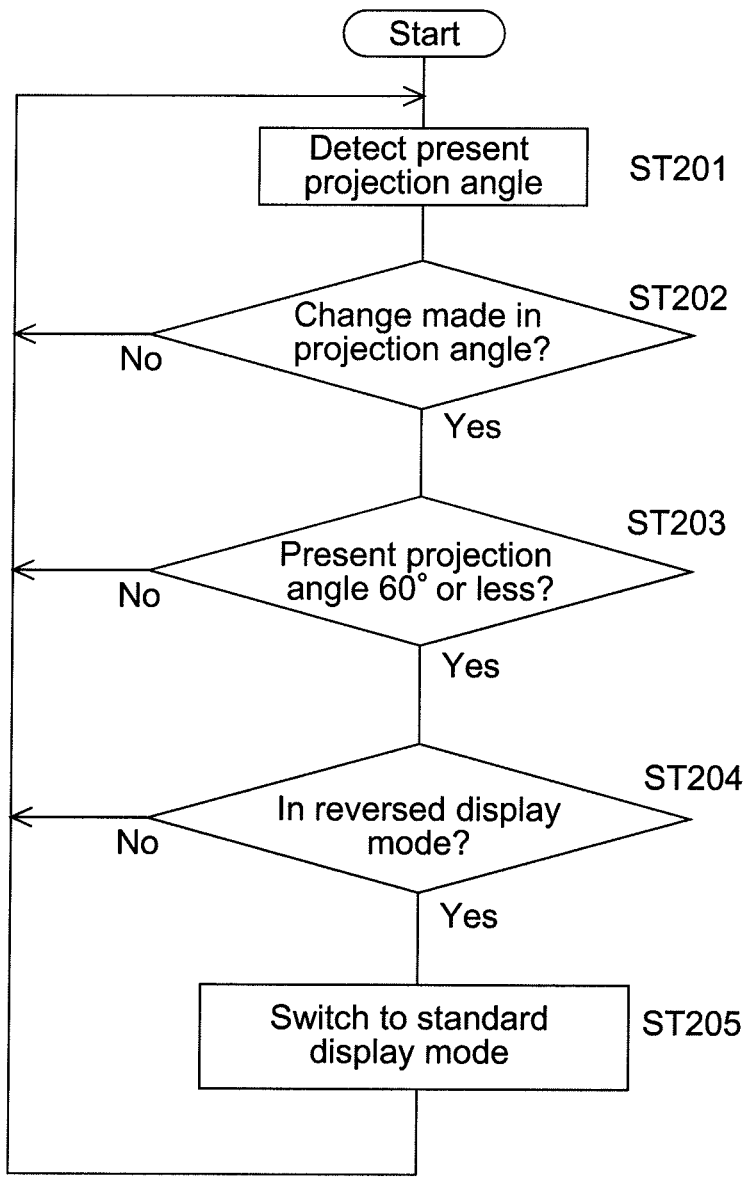
FIG. 15 is a flowchart illustrating steps of processing to return to a standard display mode according to the projection angle.

FIG. 15 is a flowchart illustrating steps of processing to return to the standard display mode according to the projection angle. First, a present projection angle is detected (ST201), and then whether a change has occurred in the projection angle is determined by comparing the present projection angle with a previously detected projection angle (ST202). When a change in the projection angle has occurred, it is next determined whether or not the current projection angle is 60° or less (ST203). When the present projection angle is 60° or less, then it is determined whether or not the present display mode is the reversed display mode (ST204). When the display mode is the reversed display mode, it is switched to the standard display mode (ST205).

The present embodiment describes an example in which the image display apparatus 1 is incorporated in the portable information processing apparatus 2. However, the image display apparatus 1 may be incorporated in other electronic devices, such as a handheld information terminal and the like. Furthermore, the image display apparatus 1 in the present embodiment is stored in the housing space of the portable information processing apparatus 2 in a manner replaceable with an optical disk apparatus. It is also possible to store the image display apparatus 1 in an electronic device such as a portable information processing apparatus and the like in a state so as to not be replaceable with other devices such as an optical disk apparatus and the like.

In the present embodiment, the projection unit, which is rotatably provided to change the projection angle in a vertical direction, is the optical engine unit that stores the entire optical engine. However, the projection unit of the present invention may be provided with at least a projection optical system, which is a portion of the optical engine. The projection angle may be changed, for example, by a mirror configuring the projection optical system.

In the present embodiment, a screen image is projected to the wall 101 and the ceiling 102. Each of the projection modes of the present invention, which are projection on the wall and projection on the ceiling, includes projection of a screen image on a screen member provided in a vertical direction or in a horizontal direction along a wall and a ceiling in a room, in addition to projection of the screen image on the actual wall and ceiling in the room.

The image display apparatus and the portable information processing apparatus having the same according to the present invention effectively improve usability for a user in projecting a screen image on a ceiling as a screen, and are useful as an image display apparatus that corrects trapezoidal distortion caused when a screen image is projected on a screen from an angle and as a portable information processing apparatus having the same.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. An image display apparatus comprising:
a projection unit capable of vertically changing a projection angle;
a projection angle detector detecting the projection angle of the projection unit; and
a screen image corrector reversing a projected screen image wherein
the screen image corrector switches the projected screen image from a reversed display to a standard display when the projection angle detected by the projection angle detector is less than or equal to a predetermined value,
wherein the image display apparatus has a standard display mode displaying a screen image in a non-reversed state and a reversed display mode displaying a screen image in a reversed state, the standard display mode and the reversed display mode being instructed by a user.

2. The image display apparatus according to claim 1, wherein, in a state where the reversed display mode is set, the screen image corrector switches the projected screen image from the reversed display to the standard display when the projection angle detected by the projection angle detector is less than or equal to a predetermined value.

3. An image display apparatus comprising:
a projection unit capable of vertically changing a projection angle;
a projection angle detector detecting the projection angle of the projection unit;
a screen image corrector correcting trapezoidal distortion of a screen image and reversing the screen image; and
an operation section controlling a first processing that changes an amount of trapezoidal distortion correction and a second processing that reverses the screen image, wherein
the operation section causes the screen image corrector to perform the first processing when the projection angle detector detects the projection angle less than or equal to a predetermined value, and the operation section causes the screen image corrector to perform the second processing when the projection angle detector detects a projection angle greater than the predetermined value.

4. The image display apparatus according to claim 3, wherein the projection unit is capable of vertically changing the projection angle so as to project the screen image on a wall and on a ceiling as a screen, and
the operation section causes the screen image corrector to perform the second processing when the projection angle detector detects the projection angle having a predetermined value that determines projection on the wall.

5. The image display apparatus according to claim 3, wherein the image display apparatus is housed in a main body of an information processing apparatus.

6. The image display apparatus according to claim 5, wherein a portable body configured with the projection unit and a support unit vertically rotatably supporting the projection unit through a hinge is insertably and removably provided to the main body.

* * * * *